United States Patent
Ray et al.

(10) Patent No.: US 7,702,364 B2
(45) Date of Patent: Apr. 20, 2010

(54) METHOD AND APPARATUS TO REDUCE MOBILE SWITCHING CENTER INVOLVEMENT IN PACKET DATA CALL SUPPORT

(75) Inventors: Dipankar Ray, Plano, TX (US); Sven Anders Börje Svensson, San Diego, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1489 days.

(21) Appl. No.: 11/010,050

(22) Filed: Dec. 10, 2004

(65) Prior Publication Data

US 2005/0185623 A1  Aug. 25, 2005

Related U.S. Application Data

(60) Provisional application No. 60/546,582, filed on Feb. 20, 2004, provisional application No. 60/546,581, filed on Feb. 20, 2004.

(51) Int. Cl.
*H04W 12/06* (2006.01)
(52) U.S. Cl. ............ 455/561; 455/411; 455/435.1; 370/328
(58) Field of Classification Search ............ 455/410, 455/411, 432.1, 432.3, 433, 435.1, 466, 517, 455/560, 561, 562.1
See application file for complete search history.

(56) References Cited

U.S. PATENT DOCUMENTS

| 5,577,029 A * | 11/1996 | Lu et al. ............... 455/560 X |
| 6,591,102 B1 * | 7/2003 | Chavez et al. ........... 455/410 X |
| 2002/0197979 A1 * | 12/2002 | Vanderveen ............ 455/410 |
| 2003/0157945 A1 * | 8/2003 | Chen et al. ............ 455/458 |

FOREIGN PATENT DOCUMENTS

| WO | WO 03/065738 | 8/2003 |
| WO | WO 03/073778 | 9/2003 |

* cited by examiner

*Primary Examiner*—Philip J Sobutka
(74) *Attorney, Agent, or Firm*—Coats & Bennett, P.L.L.C.

(57) ABSTRACT

A base station in a wireless communication network saves connection information that enables it to recognize currently authenticated mobile stations. The base station carries out localized connection management processing for authenticated mobile stations, at least for certain types of packet data connection events. By carrying out localized processing, the base station skips the connection management signaling between it and a supporting mobile switching center that would otherwise be required for processing such events. Thus, in a cdma2000 base station embodying such localized processing, the MSC's involvement in packet data connection state transitions, short data burst deliveries, etc., can be eliminated or at least greatly reduced, thereby minimizing the MSC's role in supporting packet data services. In conjunction with localized processing, the base station still may require MSC-based re-authentication by individual mobile stations according to some timed schedule, or according to some form of packet data activity monitoring.

35 Claims, 7 Drawing Sheets

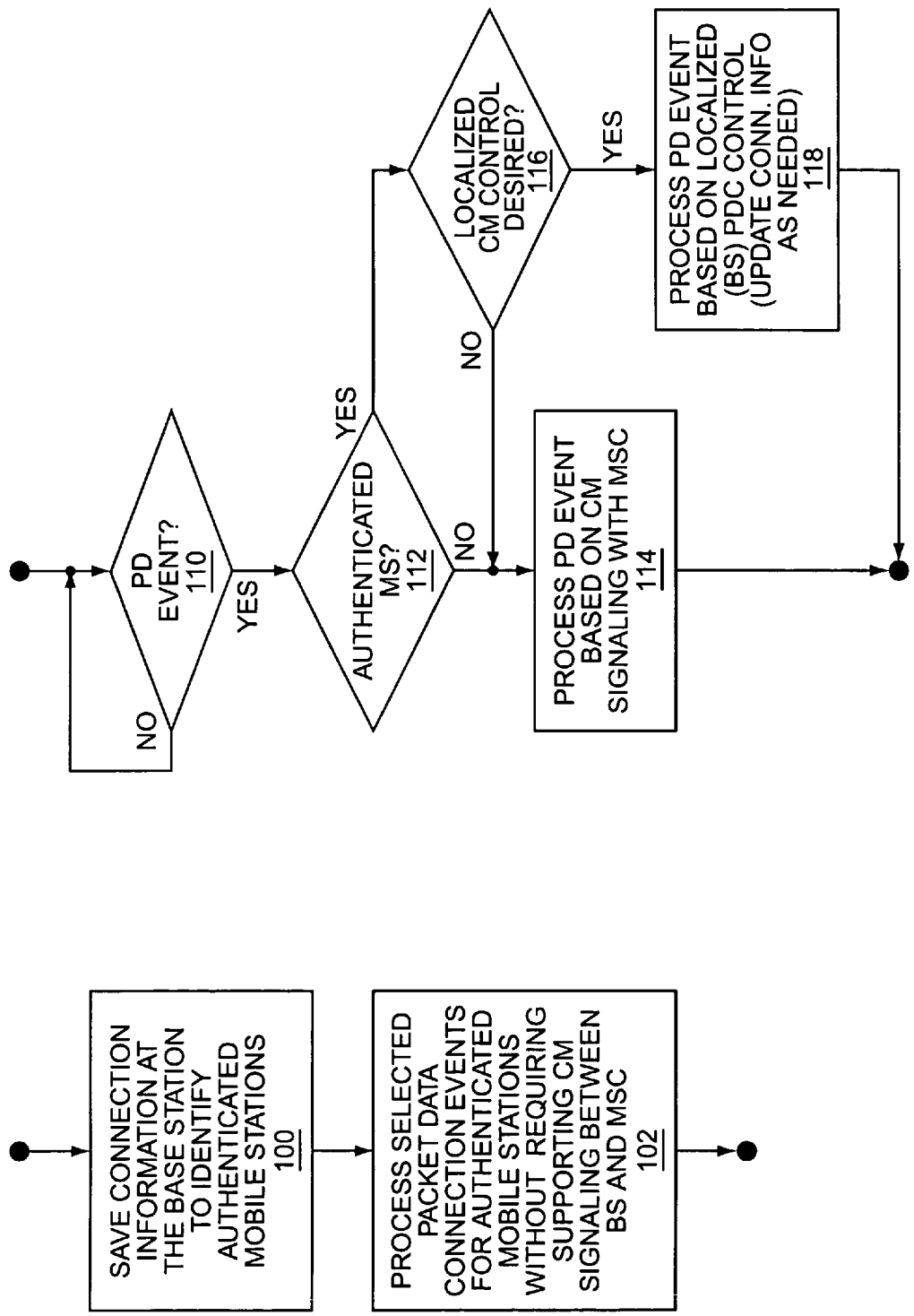

METHOD AND APPARATUS TO REDUCE MOBILE SWITCHING CENTER INVOLVEMENT IN PACKET DATA CALL SUPPORT

RELATED APPLICATIONS

The instant application claims priority under 35 U.S.C. §119(e) from the U.S. provisional patent application filed on 20 Feb. 2004, entitled "MSC Independent Packet Data," and assigned Application Ser. No. 60/546,582, and also claims priority to U.S. provisional patent application filed on 20 Feb. 2004, entitled "Intelligent Paging for Packet Data Call," and assigned Application Ser. No. 60/546,581. This application expressly incorporates the contents of the '582 and '581 provisional applications by reference herein.

BACKGROUND OF THE INVENTION

The present invention generally relates to wireless communication networks, and particularly relates to reducing the connection management signaling needed between base stations and mobile switching centers in cdma2000 networks for packet data calls.

Wireless communication networks eventually will move to an all-IP configuration and the current distinctions between "circuit-switched" and "packet-switched" call types will disappear. For the foreseeable future, however, many types of wireless communication networks include entities primarily associated with supporting "legacy" circuit-switched services, and entities primarily associated with supporting packet-switched services. Some network entities are involved in supporting both types of services and these entities can represent processing "bottlenecks" with respect to supporting the developing range of packet data services.

For example, wireless networks based on the IS-95 CDMA standards used mobile switching centers to support certain connection management functions, including mobility management and mobile station authentication functions. Call setup and call handoff in such networks required connection management signaling between base stations and mobile switching centers, both for authenticating the mobile stations and for managing resource assignments at the base stations.

By carrying forward at least some of that call processing functionality into the cdma2000 standards, the mobile switching center necessarily is involved in supporting certain aspects of packet data call processing despite its origins in circuit-switched call processing. For example, packet data call setup typically requires connection management signaling between the base station and the mobile switching center for mobile station authentication and registration. The mobile switching center's involvement continues after call setup, in particular in association with performing re-authentication of the mobile stations as needed as they transition between the dormant and active packet data states.

One disadvantage of its involvement in managing the packet data connection state transitions is that such transitions occur frequently for typical packet data applications such as web browsing, etc. The supporting connection management signaling between the base stations and the mobile switching center and the attendant re-authentication and control processing at the mobile switching center places a potentially significant processing burden on the mobile switching center.

SUMMARY OF THE INVENTION

The present invention comprises a method and apparatus to reduce connection management signaling between a base station and a mobile switching center in a cdma2000-based wireless communication network. One embodiment of the present invention reduces connection management signaling between a base station and a mobile switching center in a cdma2000 wireless communication network based on saving connection information at the base station to identify authenticated mobile stations, and processing selected packet data connection events at the base station for authenticated mobile stations without requiring supporting connection management signaling between the base station and the mobile switching center. Such events can include packet data connection state transition events and short data burst message events.

Saved connection information comprises mobile station identifiers and connection state information, for example, thereby allowing the base station to recognize that a given packet data connection event involves an authenticated mobile station. Having that recognition capability permits the base station to skip much of the connection management signaling that would otherwise be required for re-authenticating mobile stations and authorization of connections via connection management signaling with the mobile switching center each time certain types of packet data connection events occur. Notably, however, the base station may include a re-authentication control mechanism that imposes time limits on the authenticated status of individual ones of the authenticated mobile stations. That limitation prevents mobile stations from indefinitely retaining their authenticated status at the base station. A similar or equivalent re-authentication control mechanism can be based on activity limits, such as by limiting the number of packet data connection state transitions a given mobile station can undergo before requiring re-authentication via the mobile switching center.

Different types of packet data connection events can be processed at the base station for authenticated mobile stations without requiring supporting connection management signaling with the mobile switching center. By way of non-limiting examples, for authenticated mobile stations, the base station can process active-to-dormant packet data connection state transitions and, similarly, dormant-to-active state transitions. Since the packet data connection for a typical user undergoes a potentially high number of such state transitions, supporting such transitions at the base station without need for connection management signaling to the mobile switching center represents a potentially significant reduction in packet data call processing overhead at the mobile switching center.

Thus, the base station can reduce connection management signaling by maintaining connection information at the base station to identify currently authenticated mobile stations having established packet data connections with the network, and managing packet data state transitions by currently authenticated mobile stations at the base station without corresponding connection management control by the mobile switching center. Particularly, the base station manages active-to-dormant and dormant-to-active state transitions for currently authenticated mobile stations without sending corresponding connection management signaling to the mobile switching center. In this context, "managing" such transitions generally comprises allocating and de-allocating radio resources to set up and tear down radio links as needed.

In one embodiment, the base station saves connection information in association with a packet data connection being established with a given mobile station. That initial processing generally involves call set up processing between the base station and the mobile switching center, and the base station thus involves initial authentication of the mobile station via processing at the mobile switching center. The base station saves at least a mobile station identifier for the mobile station and then "hides" the first active-to-dormant state transition made by the mobile station from the mobile switching center. Consequently, the mobile switching center remains unapprised of the mobile station's transition to the dormant state. Subsequent dormant-to-active and active-to-dormant transitions by the mobile station likewise are hidden from the mobile switching center and managed at the base station based on its recognition of the mobile station as having been previously authenticated by the mobile switching center.

In one alternative embodiment, the base station signals the first active-to-dormant state transition by an authenticated mobile station to the mobile switching center but then hides subsequent dormant-to-active and active-to-dormant state transitions from the mobile switching center—i.e., it suppresses the connection management signaling that normally is required in cdma2000 networks between base stations and mobile switching centers for managing such state transitions. Consequently, the mobile switching center remains unapprised of the mobile station's transition back to the active state. Subsequent active-to-dormant and dormant-to-active transitions by the mobile station likewise are hidden from the mobile switching center and managed at the base station based on its recognition of the mobile station as having been previously authenticated by the mobile switching center.

Potential problems arise for certain call scenarios in instances where the base station has hidden the true (current) connection state of the mobile station from the mobile switching center. For example, if the base station hides the initial active-to-dormant transition of the mobile station from the mobile switching center, the mobile switching center will retain an active state status indication for the mobile station's packet data connection. Thus, incoming (mobile-terminated) circuit-switched (voice) calls may be routed unnecessarily to voice mail, or a busy tone may be incorrectly returned to the calling party. To avoid these issues, the base station can be configured not to hide state transitions any mobile station whose subscriber profile is such that it would end up erroneously missing incoming voice calls unless the mobile switching center remains apprised of its true packet data connection state.

Thus, the base station can be configured to hide state transitions if the mobile station's subscriber profile supported concurrent voice and data services, since incoming voice calls would be received regardless of whether the mobile switching center has the mobile station's packet data connection marked as active or dormant. Similarly, state transitions can be safely hidden for mobile stations having subscriber profiles indicating Voice-Prioritization-Over-Packet-data (VPOP).

Additional mechanisms can be implemented at the base station to ensure correct call processing despite hiding packet data connection state transitions from the mobile switching center. For example, if the active state of a given mobile station's packet data connection has been hidden from the mobile switching center, it may be necessary to apprise the mobile switching center of the true connection state if an incoming voice call is received for the mobile station. The base station can be configured to accomplish that appraisal by sending a connection management service request message to the mobile switching center responsive to receiving a page request from it for the incoming voice call.

Of course, the present invention's localized handling of selected packet data connection events at the base station based on recognizing those events as involving previously authenticated mobile stations is not limited to the above features and advantages. Those skilled in the art will recognize additional features and advantages upon reading the following detailed description, and upon viewing the accompanying figures.

BRIEF DESCRIPTION OF THE DRAWINGS

One or more embodiments of the present invention are illustrated in the accompanying drawings, wherein:

FIG. 2 illustrates general processing logic at a base station for supporting localized connection management processing to minimize a mobile switching center's involvement in packet data services support;

FIGS. 3 and 4 illustrate processing logic details complementing FIG. 2; and

DETAILED DESCRIPTION OF THE INVENTION

Figure 1:
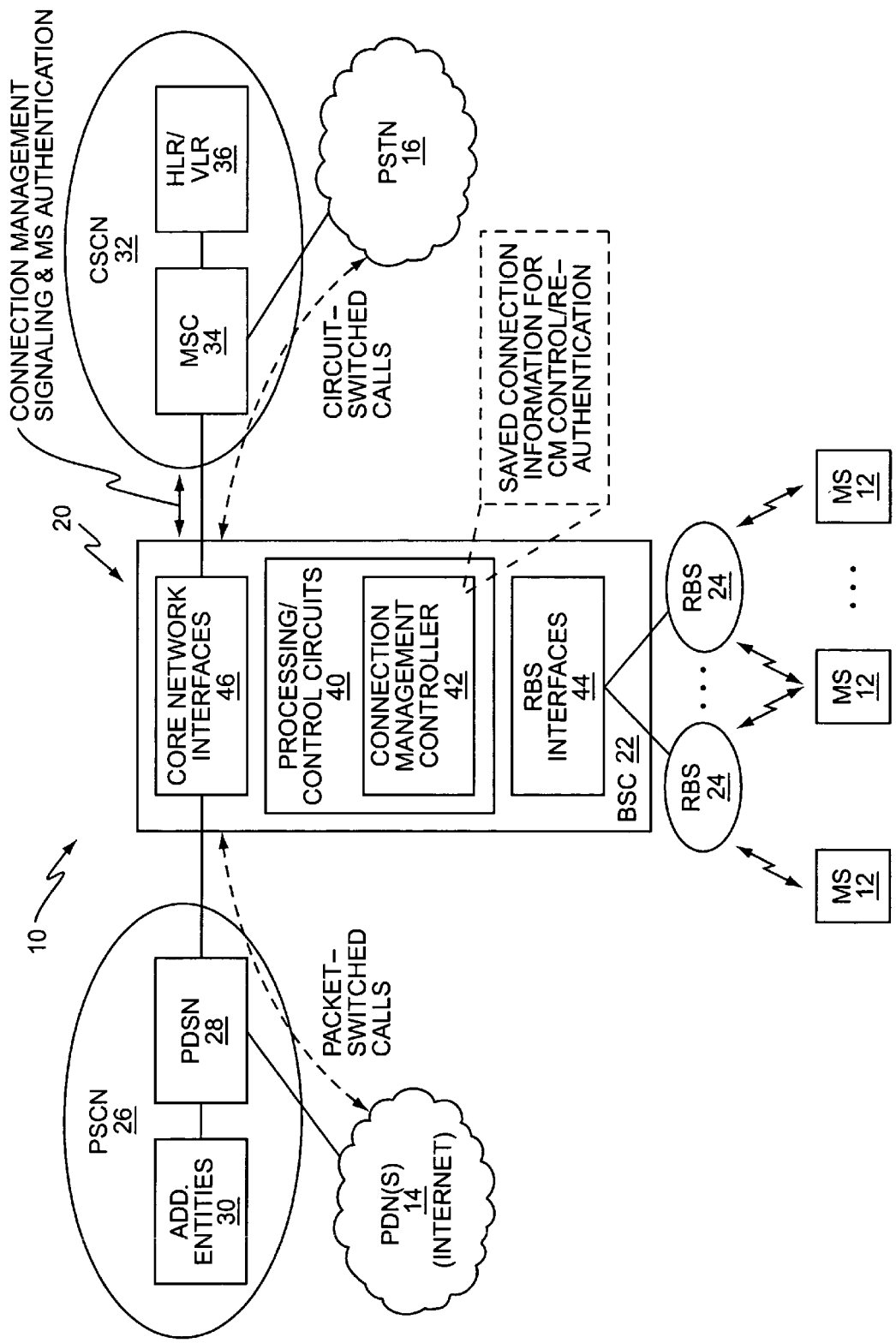
FIG. 1 illustrates a wireless communication network according to one or more embodiments of the present invention.

FIG. 1 illustrates a cdma2000-based wireless communication network 10 according to one or more embodiments of the present invention. The network 10 communicatively couples mobile stations 12 to one or more Public Data Networks (PDNs) 14, such as the Internet, and to the Public Switched Telephone Network (PSTN) 16.

Supporting that functionality, the illustrated network 10 comprises a Radio Access Network (RAN) 20, including a Base Station Controller (BSC) 22 and one or more Radio Base Stations (RBSs) 24, a Packet Switched Core Network (PSCN) 26, including a Packet Data Serving Node (PDSN) 28 and one or more additional entities 30, and a Circuit Switched Core Network (CSCN) 32, including a Mobile Switching Center 34 and a Home Location Register/Visitor Location Register (HLR/VLR) 36.

In general, packet-switched calls to and from the mobile stations 12 are routed through the PSCN 26 and circuit-switched calls to and from them are routed through the CSCN 32. To support circuit-switched and packet-switched call services, BSC 22 comprises one or more processing/control circuits 40, including a connection management controller 42, RBS interface circuits 44, and core network interface circuits 46. While not material to the present invention, interface circuits 46 may include a Packet Control Function (PCF) to support the radio-packet interface between the PDSN 28 and the BSC 22. Those skilled in the art will appreciate that the PCF can be integrated within or apart from the BSC 22.

Cdma2000 networks involve the MSC 34 in packet data call support, even though it is more properly considered part of the circuit-switched call network. Later material herein details the nature of such involvement, but for now it is sufficient to note that establishing and managing the packet data connections of individual ones of the mobile stations 12 requires potentially significant connection management signaling between the BSC 22 and the MSC 34, even though the packet data traffic flowing on those logical connections itself is not routed through the MSC, but rather through the PDSN 28.

In one or more of its embodiments, the present invention removes, or at least reduces, the dependency of packet data services on supporting processing by the MSC 34 in the circuit-switched side of network 10. While the benefits of reducing the existing dependency are many, reducing the packet data call-setup time and avoiding MSC processing bottlenecks for packet data services stand as primary benefits. Reductions in call setup time for packet data services yield particularly significant benefits in the context of real-time packet data services, such as push-to-talk applications.

In existing cdma2000 networks, MSCs are involved in a number of supporting services for packet data calls, including these items: location update/authentication/authorization/validation with assistance from HLRs and Accounting servers; maintaining subscriber information in VLRs; connection managing signaling for call setup (origination/termination); paging initiations; hard handoff/fast handoff support (intra PDSN, inter PDSN, inter/intra PCF/BSC); dormant handoff support; mobile station parameter changes/update support (call history, COUNT, SSD parameters); OTASP/OTAPA support; authentication for short data burst originations and ADDS paging termination; concurrent services setup and handoff support; and Short Messaging Services (SMS) support.

With the above existing dependencies in mind, the present invention provides a method and apparatus whereby cdma2000 base stations reduce connection management signaling between the base station and the MSC based on saving connection information at the base station to identify authenticated mobile stations and processing selected packet data connection events at the base station for authenticated mobile stations without requiring supporting connection management signaling between the base station and the mobile switching center. As used herein, the term "base station" is given broad construction, and generically refers to the call control and radio resources that provide a communicative link with the mobile stations 12. Thus, the BSC 22 and one or more of the RBSs 24 may be viewed as a base station, but it should be understood that other base station configurations are practiced in the art, and such variations are contemplated by the present invention.

According to the present invention, the connection management controller 42 of the BSC 22 maintains saved connection information that is uses to reduce the required connection management signaling, including authentication signaling, between the BSC 22 and the MSC 34 for management and control of the packet data connections being supported by BSC 22. It should be understood that connection management controller 42 can be configured as hardware, software, or any combination thereof. In at least one embodiment, controller 42 comprises one or more microprocessor circuits configured according to the present invention based on computer program instructions stored in a memory/storage device included in BSC 22.

FIG. 2 illustrates one embodiment of the present invention's general method of reducing the need for connection management signaling between BSC 22 and MSC 34 in support of at least some of the packet data connection events associated with the packet data connections established between network 10 and one or more of the mobile stations 12. The illustrated processing begins with BSC 22 saving connection information to identify authenticated mobile stations 12 (Step 100). For example, controller 42 saves the information in a BSC memory circuit identifying mobile stations 12 that have been authenticated by the MSC 34 and/or HLR/VLR 36. Thus, controller 42 can be configured to save a corresponding mobile station identifier responsive to a given mobile station 12 being authenticated by the MSC 34/HLR 36 as part of packet data call setup processing.

With the above information thus saved for one or more mobile stations 12, BSC 22 processes selected packet data connection events for such authenticated mobile stations 12 without requiring supporting connection management signaling between the BSC 22 and the MSC 34 (Step 102). Note that connection management signaling is abbreviated as "CM signaling" in various ones of the figures.

FIG. 3 illustrates one or more embodiments of packet data connection event processing, wherein the saved connection information at the BSC 22 enables "localized" event processing at the BSC 22 without need for supporting connection management signaling to the MSC 34. By way of non-limiting examples, the packet data connection events of interest include state transitions—i.e., transitions in the packet data connection states of the mobile stations 12 between dormant and active states—and short data burst message terminations and originations to and from the mobile stations 12.

BSC 22 monitors for packet data connection events (Step 110). In response to detecting a packet data connection event, BSC 22 uses the saved connection information to determine if the event involves a currently authenticated mobile station 12 (Step 112). Note that the saved connection information generally includes at least mobile station identifiers corresponding to the mobile stations 12 that the BSC 22 considers as currently authenticated. If the event involves a mobile station that is not currently authenticated, BSC 22 may be configured to process the event as would a conventional cdma2000 base station—i.e., it undertakes whatever supporting connection management signaling is conventionally required between it and the MSC 34 to process the detected event (Step 114).

Similarly, if the event involves an authenticated mobile station 12, but one for which localized connection management control is not desired (Step 116), BSC 22 carries out conventional connection management control signaling with MSC 34 (Step 114). Various reasons might exist for forcing conventional—i.e., non-localized connection management control—for a given mobile station 12. For example, in at least one embodiment of the present invention, BSC 22 "hides" the true packet data connection states of the authenticated mobile stations 12 from the MSC 34 to avoid the need for sending connection management signaling to the MSC 34 as part of transitioning individual ones of the mobile stations 12 between the active and dormant packet data connection states. For certain subscriber profiles, such as those preventing concurrent services voice call delivery, or for subscribers profiles that do not specify VPOP, incoming voice calls can be needlessly missed if localized processing at the BSC 22 causes MSC 34 erroneously to "believe" that a given one of the mobile stations 12 has an active packet data connection when in reality its connection is dormant. Such details are further explored later herein.

Returning to the processing flow of FIG. 3, and assuming that localized processing of the detected event is desired, BSC 22 carries out localized processes involved an authenticated mobile station 12 (Step 118). "Localized" processing as used herein denotes packet data connection management control processing undertaken by the BSC 22 without requiring the supporting BSC-to-MSC connection management signaling ordinarily required in cdma2000 networks. Thus, a localized control response by the BSC 22 to a dormant-to-active state transition by an authenticated mobile station 12 comprises the BSC 22 verifying that the mobile station 12 is one of the currently authenticated mobile stations 12, as indicated by the mobile station identifiers saved at BSC 22, and then allocating radio resources as needed—i.e., performing traffic channel setup—without sending the conventionally required service request connection managing signaling to the MSC 34.

In other words, at least for mobile stations 12 that are considered by the BSC 22 as being currently authenticated, the MSC 34 is removed from the processes of allocating and de-allocating radio resources at the BSC 22 responsive to dormant-to-active and active-to-dormant packet data connection state transitions by authenticated ones of the mobile stations 12 having established packet data connections being supported by BSC 22. Note that processing state transitions locally at the BSC 22 generally requires the BSC 22 to track the connection state of the authenticated mobile stations. Thus, the saved connection information may further include a connection state flag, or other information, for each saved mobile station identifier, that is dynamically updated to reflect the current (true) state of each authenticated mobile station's packet data connection. Note that, since localized processing of state transitions at the BSC 22 effectively hides such transitions from the MSC 34, any connection state information stored at MSC 34 can be out of synch with the true connection state of the authenticated mobile stations 12.

Figure 4:
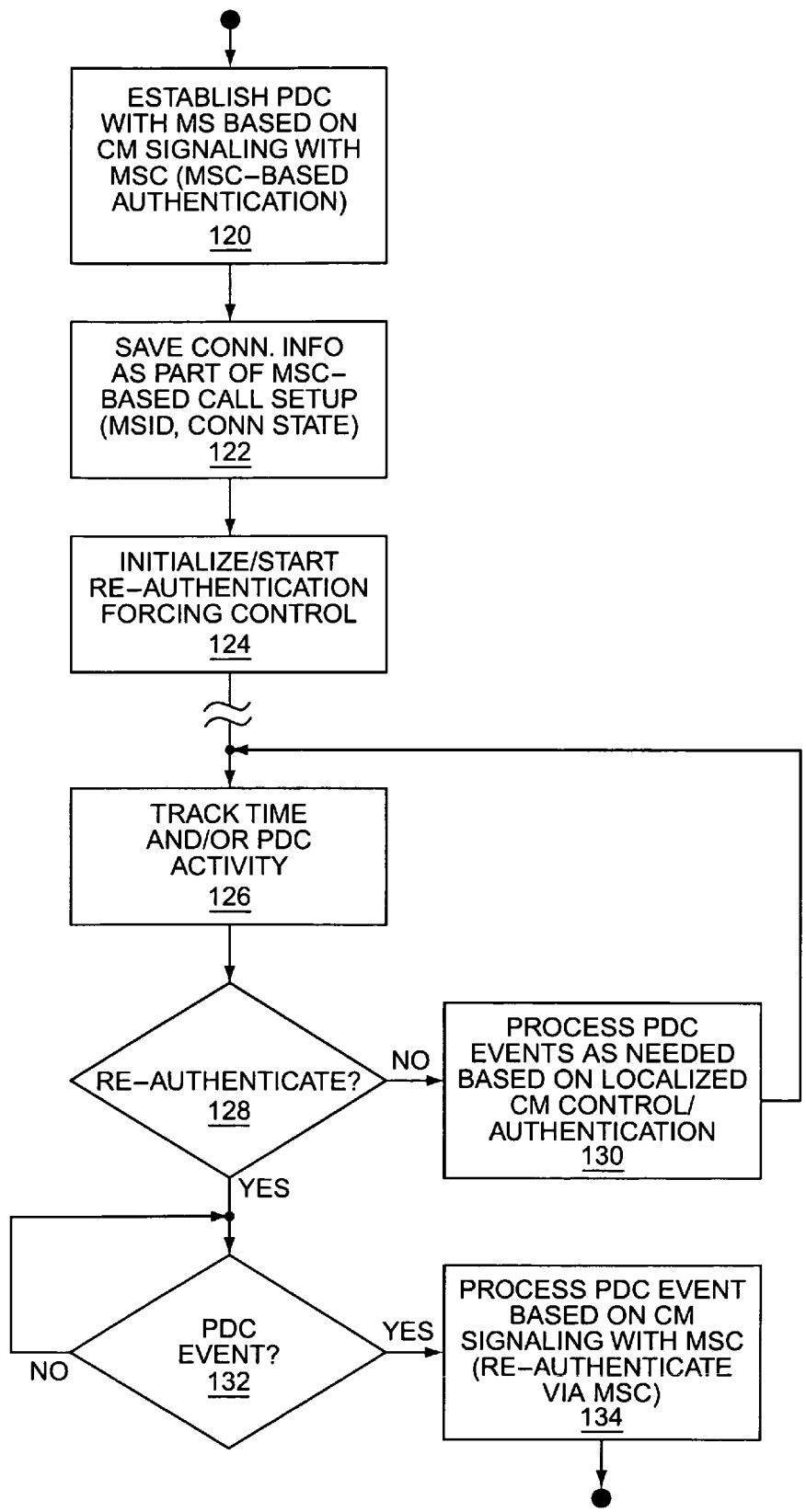

FIG. 4 continues the illustration of the various bases for localized BSC processing of selected packet data connection events for one or more invention embodiments. In particular, FIG. 4 illustrates processing including packet data call setup, and subsequent to setup. Processing thus begins with establishing a packet data connection—abbreviated "PDC" in the drawings—with a given mobile station 12 based on connection management signaling between the BSC 22 and the MSC 34 in accordance with conventional cdma2000 processing (Step 120). Part of that processing involves authentication of the mobile station 12 by the MSC 34, such as by the MSC 34 communicating with the HLR/VLR 36.

BSC 22 saves connection information in a local memory for the mobile station 12 responsive to the successful call setup and authentication (Step 122). As before, the mobile-specific connection information may comprise a mobile station identifier and a connection state flag. In one or more embodiments, the mobile station identifier comprises a copy of the International Mobile Station Identifier (IMSI) that is transmitted by the mobile station 12 as part of its communications with network 10. As those skilled in the art appreciate, transmission of IMSIs by mobile stations 12 is part of the authentication process in existing cdma2000 networks.

Thus, by saving the IMSI of each mobile station 12 as it is authenticated by the MSC 34, during call setup for example, the BSC 22 builds a database of currently authenticated mobile stations 12 and thus can skip selected BSC-to-MSC connection management signaling for at least some types of packet data events based on its ability to recognize that such events involve mobile stations 12 that have been previously fully authenticated.

Of course, BSC 22 may be configured to avoid circumstances wherein such mobile stations 12 remain indefinitely authenticated at the BSC level. In other words, the present invention contemplates the inclusion of some re-authentication forcing control at BSC 22 that forces each of the currently authenticated mobile stations 12 to be re-authenticated via full connection management signaling between the BSC 22 and the MSC 34 after the passage of defined time period and/or after some defined amount of packet data connection activity.

Processing thus continues in FIG. 4 with BSC 22 initializing/starting a re-authentication forcing control mechanism subsequent to registering the mobile station 12 as authenticated, and thereby placing a time/activity limits (Step 124). That action places limits on how long BSC 22 will perform localized processing of packet data events for the mobile station 12 before requiring MSC-based re-authentication.

Therefore, for each mobile station considered by BSC 22 to be currently authenticated, BSC 22 tracks the time and/or activity of the mobile station since the last MSC-based re-authentication (Step 126). A time-based re-authentication forcing control may be configured to require re-authentication every 24 hours, for example, or some shorter period if security concerns warrant. An activity-based re-authentication forcing control may be configured to require re-authentication after some set number of packet data connection state transitions, for example. Thus, the BSC 22 might limit the number of dormant-to-active and/or active-to-dormant state transitions that a currently authenticated mobile station 12 can undergo before re-authentication is required.

Whether based on time or activity, if re-authentication is not yet required for the mobile station 12 (Step 128), BSC 22 continues with localized processing—which includes a form of BSC-based authentication inasmuch as BSC 22 recognizes the mobile station as currently authenticated based on matching received mobile station identification information to an identifier in the saved connection information—as needed for packet data connection events (Step 130). However, if it is time for re-authentication, BSC 22 may wait until the next packet data connection event occurs (Step 132) before requiring re-authentication. Thus, upon occurrence of the next packet data connection event for the mobile station, BSC 22 can force MSC-based re-authentication of the mobile station 12 by carrying out conventional (non-localized) processing of the event based on connection management signaling with the MSC 34 (Step 134). After re-authentication, the BSC 22 can revert to localized packet data connection event processing for the mobile station until the next time for re-authentication.

Figure 5:
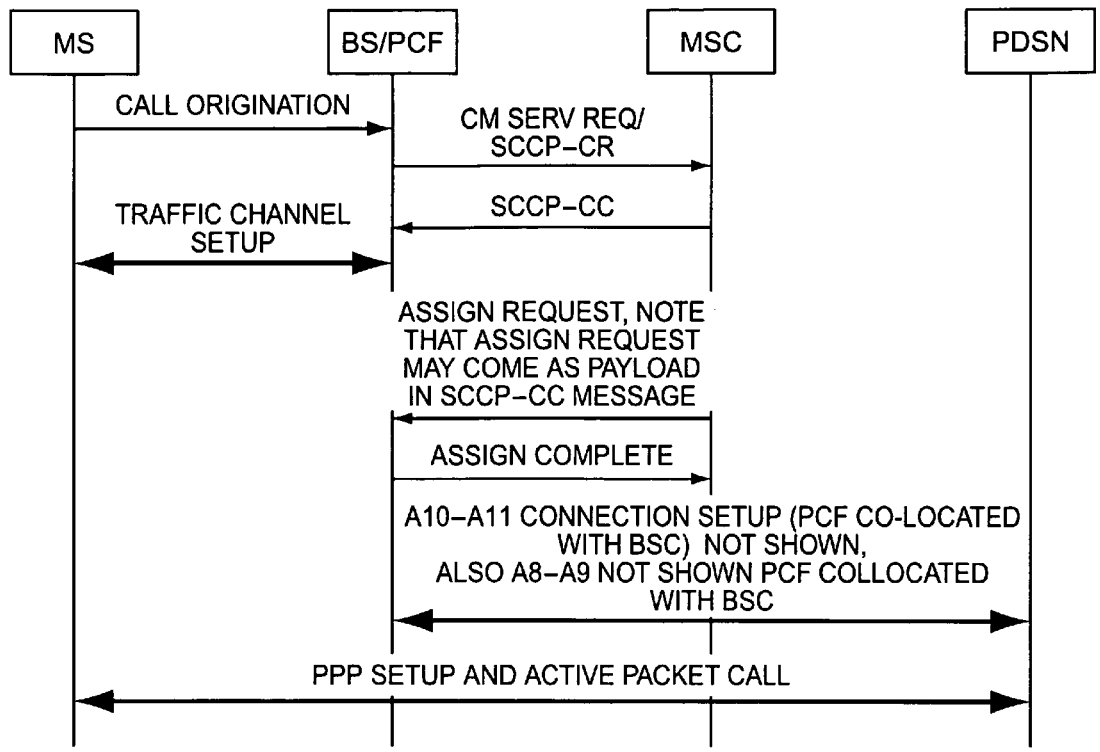
FIGS. 5-11 illustrate several call flows, including selected connection management signaling that arises from operation of the present invention.

To highlight various aspects of the above inventive processing, FIGS. 5-11 illustrate selected BSC-MSC call flow signaling scenarios. For example, FIG. 5 illustrates the cdma2000 call flow signaling associated with packet data call origination by a given one of the mobile stations 12. The present invention generally does not alter the conventional call flow steps of FIG. 5, and one sees that the call origination by the mobile station 12 causes BSC 22 and MSC 34 to engage in selected connection management signaling. Specifically, BSC 22 sends a Connection Management (CM) Service Request message to MSC 34, which is associated with the Signaling Connection Control Part (SCCP) of the BSC 22 and MSC 34. In turn, MSC 34 sends an SCCP Connection Control response—e.g., a Service Request Response message—to the BSC 22 causing it to set up a traffic channel for the mobile station's packet data call.

Thus, according to cdma2000 signaling conventions, the initial allocation of resources to a packet data call requires BSC-to-MSC signaling. (FIG. 5 illustrates subsequent call processing for completeness but such processing is not germane to understanding the present invention and it is not discussed, and other ones of FIGS. 6-11 include similar, non-germane call processing steps that are not described herein.)

Figure 6:
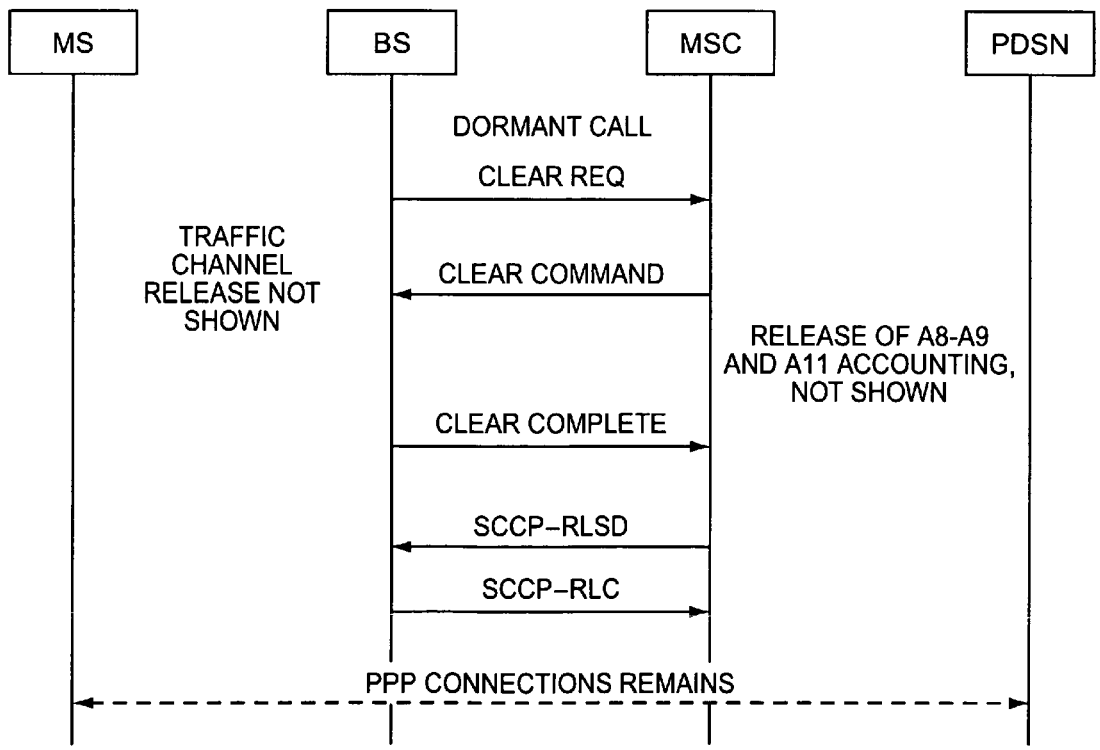
Figure 7:
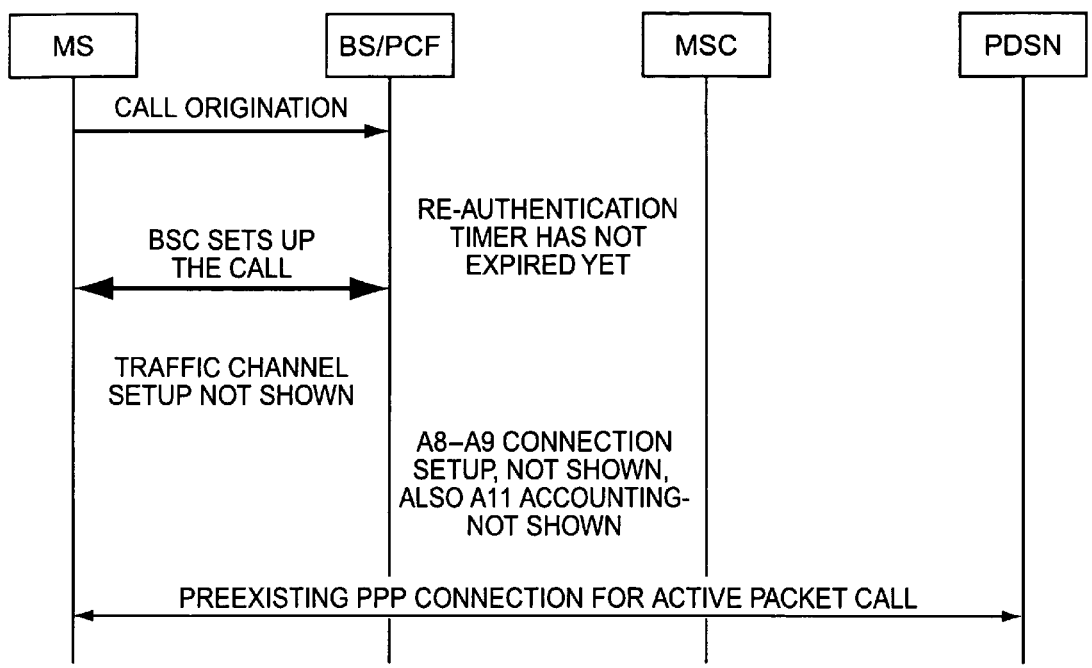

FIGS. 6 and 7 together illustrate one embodiment of the present invention, wherein the first active-to-dormant packet data connection state transition is conventionally signaled to the MSC 34 by the BSC 22—the Clear Request message sent by BSC 22 to MSC 34—but wherein the subsequent dormant-to-active transition is not signaled by the BSC 22. FIG. 7 illustrates that the BSC 22 hides the subsequent dormant-toactive transition from the MSC 34 by not sending a CM Service Request message to the MSC 34 when the BSC 22 receives a call origination from the mobile station 12 signaling that the mobile station 12 is transitioning back to the active connection state. Note that when the BSC 22 receives that call origination, it recognizes that originating mobile station 12 is currently authenticated and thus it sets up the call—allocates the needed radio resources—based on localized processing at the BSC 22.

Note that by skipping the conventional connection management signaling, MSC 34 remains unapprised of the true state of the mobile station's packet data connection. That is, MSC 34 had previously marked the connection state for the mobile station as dormant, and will retain that status even though the mobile station has gone active. The BSC 22 can further hide any subsequent active-to-dormant and dormant-to-active transitions by the mobile station 12, at least within the limits imposed by any re-authentication forcing control running at the BSC 22. Thus, the conventional connection management signaling overhead associated with managing the packet data connection state transitions of the mobile station 12 can be offloaded from the MSC 34 by supporting such management based on localized processing at the BSC 22.

Note, too, that FIG. 7 shows that the decision to suppress the supporting connection management signaling from the BSC 22 to the MSC 34 that otherwise would be required for setting up the call depended the BSC 22 checking whether the re-authentication forcing control for the originating mobile station 12 had expired, or otherwise had reached its defined limit. If so, BSC 22 would not have performed localized connection management, but rather would have relied on MSC support for re-authentication and call setup by undertaking conventional connection management signaling with the MSC 34.

Figure 8:
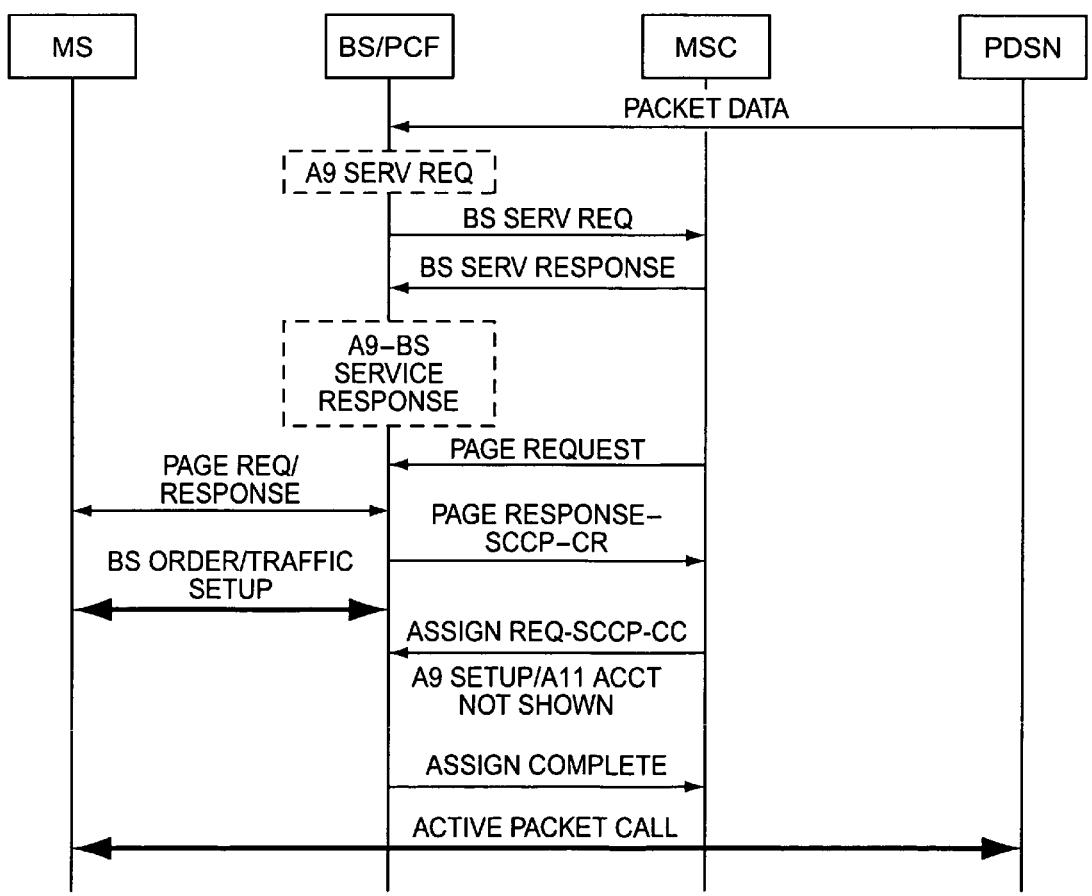

FIG. 8 illustrates call processing in the context of a network-initiated packet data call, wherein authentication (or re-authentication) of the mobile station 12 is required. Thus, BSC 22 receives an "A9 Service Request" message from the supporting PCF, which sent the message in response to receiving incoming packet data from the PDSN 28. In turn, BSC 22 carries out conventional connection management signaling with MSC 34 to set up the call and thereby transition the mobile station 12 from its dormant state to the active state.

Figure 9:
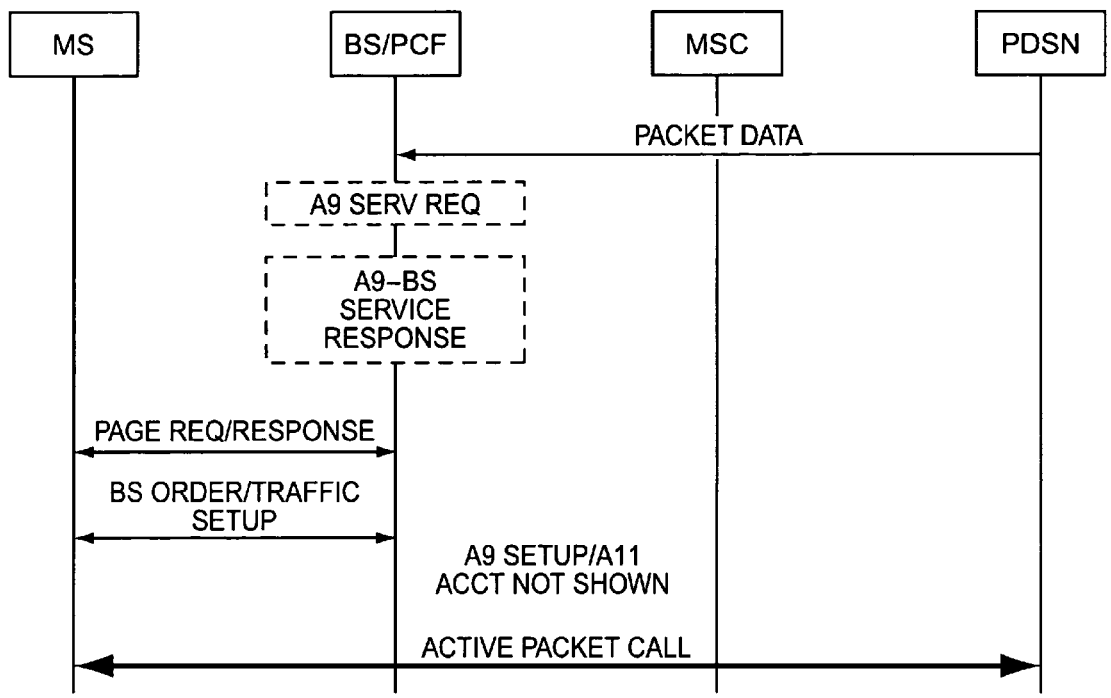

FIG. 9 illustrates the same network-initiated state transition, but where the mobile station 12 is currently authenticated. Thus, BSC 22 skips the connection management signaling with the MSC 34, and undertakes localized connection management processing, wherein its sets up the call without requiring supporting connection management signaling to the MSC 34.

Figure 10:
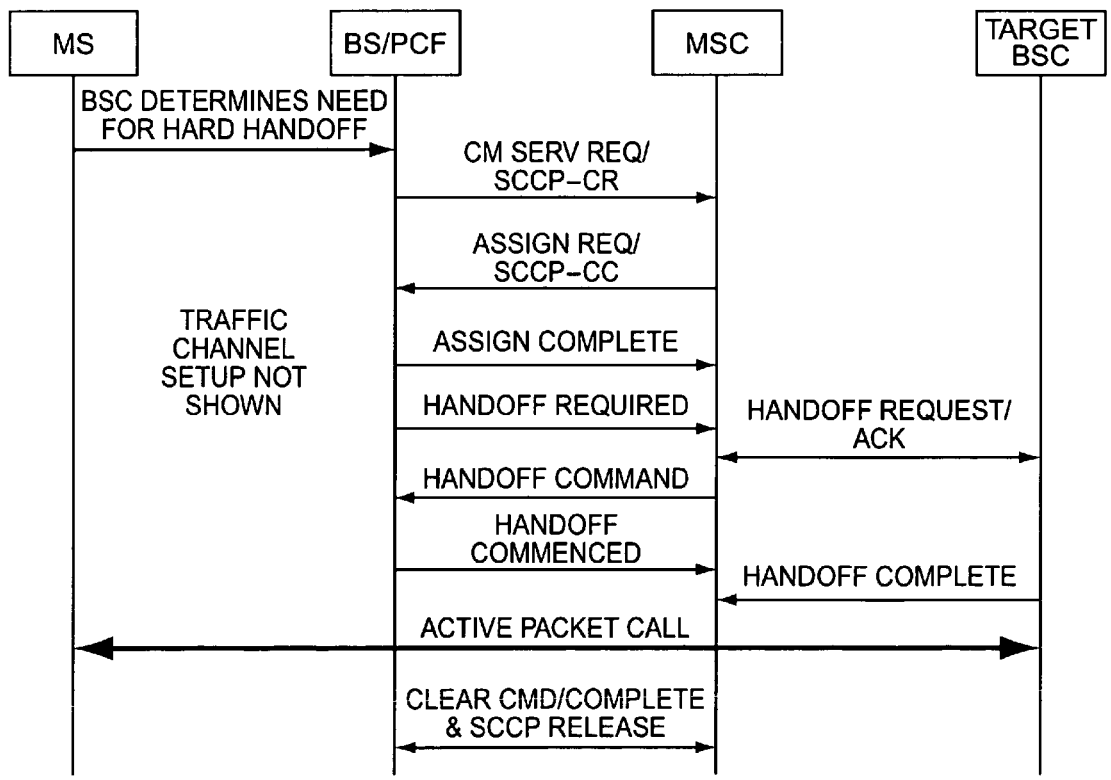

FIG. 10 illustrates hard handoff processing according to one or more embodiments of the present invention. In the context of FIG. 10, the active state of the mobile station 12 has been hidden from the MSC 34 because of localized connection management processing at the BSC 22, and the MSC 34 erroneously believes that the mobile station 12 is in the dormant state. Therefore, the BSC 22 must make the MSC 34 aware that the mobile station 12 is active before sending handoff request messaging to the MSC 34.

Thus, with regard to conventional hard handoff processing and its attendant BSC/MSC connection management signaling, the BSC 22 here sends an "extra" or superfluous CM Service Request message before sending the Handoff Required message. The CM Service Request message is considered superfluous because it is not needed to set up a traffic channel for the mobile station 12 at the BSC 22—indeed, the BSC 22 has already allocated a traffic channel to the mobile station 12 based on localized processing. Instead, the CM Service request message simply triggers the MSC 34 to update its connection state information for the mobile station 12, such that the MSC 34 correctly responds to the subsequent handoff request signaling from the BSC 22.

Note that the BSC 22 may optionally add a "no authentication required" parameter to the CM Service Request message if doing so will avoid unnecessary authentication processing at the MSC 34. If the Inter Operability Standards (IOS) allows SCCP setup without sending the CM Service Request message from BSC 22, then a SCCP-CR signaling message may be used instead of the CM Service Request message.

To prevent delays in hand off processing, the BSC 22 can be configured to monitor movement by the mobile stations 12, and detect their encroachment into cell border regions where the hard handoff may be required. For example, the BSC 22 can be configured to send the CM Service Request message to MSC 34 responsive to detecting encroachment into a border region by a given mobile station 12 to apprise the MSC 34 of the mobile station's actual connection state in advance of a hard hand off being subsequently required.

Figure 11:
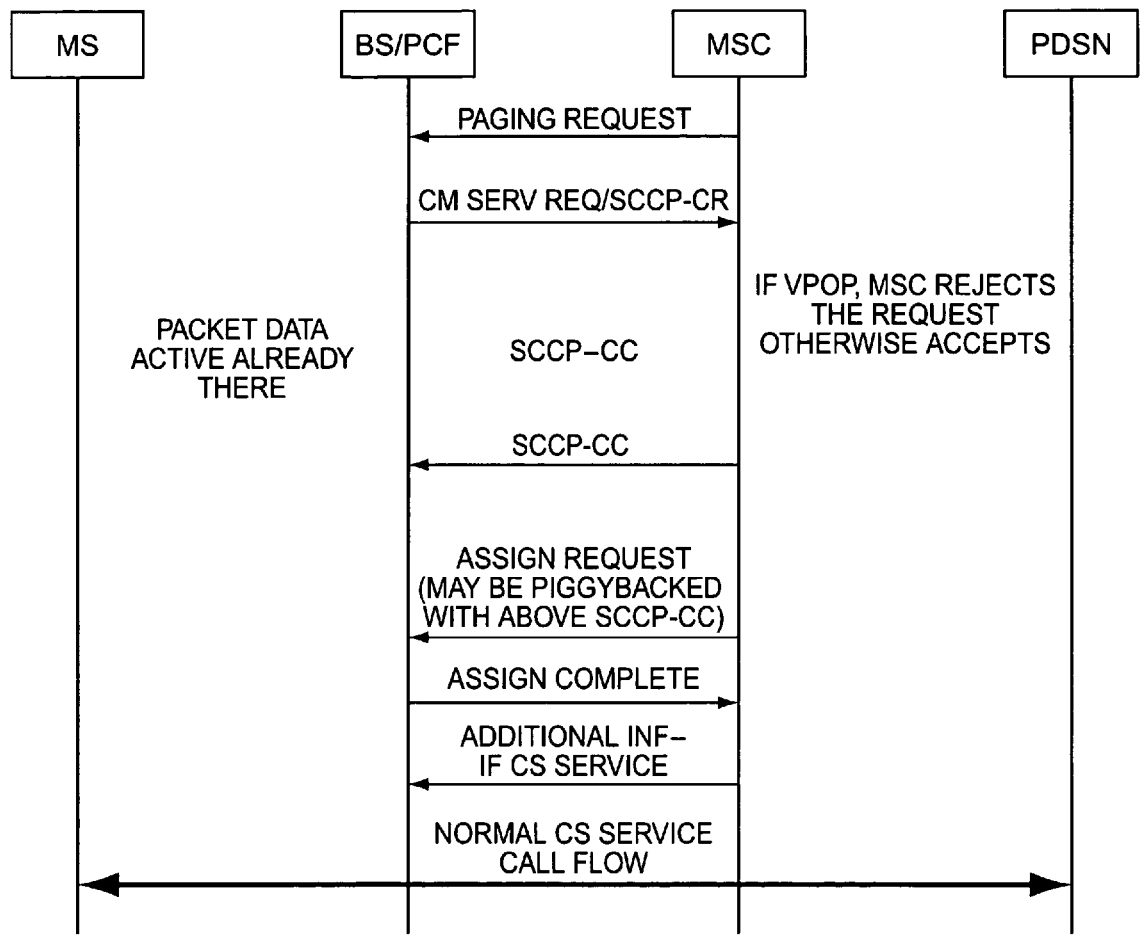

Finally, FIG. 11 illustrates a call flow wherein the MSC 34 receives an incoming circuit-switched call for a given one of the authenticated mobile stations 12. More particularly, the call flow assumes that one or more state transitions have been hidden from the MSC 34 and that MSC 34 believes the mobile station 12 is in the active state when, in reality, the mobile station 12 has been transitioned to the inactive state by the BSC 22 based on the BSC's localized connection management processing.

Generally, each mobile station 12 has a corresponding subscriber profile that specifies a number of parameters for the mobile station, such as these items: whether concurrent services should be allowed for the mobile station; whether the subscriber has VPOP; and whether the subscriber has neither concurrent-services capability nor VPOP. Assume that for a given mobile station 12 for which concurrent services is not supported or is not enabled, the MSC 34 believes that the mobile station 12 is dormant. If the mobile station 12 actually is dormant and a voice call comes into the network 10 for that mobile station 12, there is no connection state mismatch between the MSC 34 and the BSC 22 and the call will be delivered to the mobile station 12 according to conventional connection management processing.

However, if the mobile station 12 is active, and the MSC 34 believes the mobile station is dormant (or inactive) because the BSC 22 has hidden one or more state transitions from the MSC 34, then the call flow of FIG. 11 can be followed wherein the BSC 22 is configured to send a CM Service Request message, or some equivalent message, responsive to receiving a Paging Request from the MSC 34, so that the MSC 34 can be apprised of the mobile station's true (active) packet data connection state. To the MSC 34, such signaling simply makes it appear that the mobile station 12 became active concurrent with its paging notification and thus the MSC 34 can undertake the necessary call handing according to the subscriber profile.

If the subscriber has concurrent services enabled, the voice call will be terminated at the mobile station 12 and the mobile station's current packet data call will be continued. After receiving the "Assign complete" message, the MSC 34 will send the "Additional info" message for the voice call" after timer expires for paging, or before expiration, depending on the implementation. (This scenario is equivalent to initiation of a packet call by the mobile station 12 before the BSC 22 gets the paging request and the subscriber has concurrent service.)

If the subscriber has VPOP, the MSC 34 will reject the CM service request for packet call from the BSC 22, and the BSC 22 will immediately clear the packet call and initiate paging of the mobile station 12, so that the prioritized voice call can be terminated at the mobile station 12. BSC 22 thus sends back the "Page Response" message after getting the corresponding page response from the mobile station 12.

If the subscriber does not have concurrent services or VPOP, the MSC 34 will accept the CM service request from the BSC 22 and will send back the "Assign Request" message for the packet call, which was already ongoing despite the MSC 34 previously being unaware of that fact. BSC 22 then sends back the "Assign Complete" message, which makes it appear to the MSC 34 that a new traffic channel connection was setup for the mobile station 12. After the MSC's paging timer expires, it forwards the voice call according to subscriber's profile, such as to voice mail, or returns a busy tone indication to the calling party as appropriate.

Turning from the call processing flows, it should be noted that the BSC 22 can be configured to carry out localized connection management processing for a wide range of packet data connection event types. For example, the BSC 22 can use its saved connection information to recognize authenticated mobile stations sending or receiving short data burst messages, and thus skip connection management signaling with the MSC 34 in favor of its localized processing of those events. Thus, for short data burst processing, if authentication is required, BSC 22 undertakes conventional connection management processing wherein it relies on connection management support by the MSC 34.

However, if re-authentication is not required, then the BSC 22 sends the short data burst message data directly to the PDSN 28 for mobile-originated short data bursts. Similarly, if re-authentication is not required, the BSC 22 sends the short data burst message data directly to the targeted mobile station 12 for mobile-terminated short data bursts. If the targeted mobile station 12 is dormant, BSC 22 pages it for receipt of the short data burst independent of the MSC 34.

In general, the BSC 22 can be configured to carry out localized processing of a variety of packet data connection event types, with the above short data burst events, state transition events, and hard handoff events being representative but non-exhaustive examples. Because of the BSCs ability to recognize already-authenticated mobile stations 12 and carry out localized connection management processing for them, the connection management signaling between the BSC 22 and the MSC 34 that would otherwise be required is avoided. Thus, a host of packet data connection event processing tasks are offloaded from the MSC 34, thereby minimizing its involvement in packet data services and improving its ability to provide circuit-switched call support, particularly by improving its capacity during Busy Hour Call Attempt (BHCA) processing.

It therefore should be understood that the present invention is not limited by the above examples. Instead, the present invention is limited only by the following claims and their reasonable legal equivalents.

What is claimed is:

1. A method of reducing connection management signaling between a base station and a mobile switching center in a cdma2000 wireless communication network, the method comprising:
   saving connection information at the base station to identify authenticated mobile stations; and
   processing selected packet data connection events at the base station for authenticated mobile stations without requiring supporting connection management signaling between the base station and the mobile switching center; and,
   for each mobile station that is considered by the base station to be currently authenticated, maintaining a re-authentication counter that limits the number of state transitions that can be made by the mobile station before a re-authentication by the mobile switching center is required.

2. The method of claim 1, wherein saving connection information at the base station to identify authenticated mobile stations comprises saving mobile station identifiers for mobile stations authenticated by the mobile switching center, and further saving connection state information for the authenticated mobile stations to thereby allow the base station to track the packet data connection states of authenticated mobile stations.

3. The method of claim 1, wherein the selected packet data connection events include packet data connection state transitions by authenticated mobile stations and short data burst message deliveries to and from authenticated mobile stations.

4. The method of claim 1, wherein processing selected packet data connection events at the base station for authenticated mobile stations without requiring supporting connection management signaling between the base station and the mobile switching center comprises:
   detecting a packet data connection event involving a given mobile station;
   identifying the mobile station as an authenticated mobile station based on comparing the saved connection information with mobile station identification information received in association with the packet data connection event; and
   processing the packet data connection event at the base station without requiring supporting connection management signaling between the base station and the mobile switching center.

5. The method of claim 1, wherein processing selected packet data connection events at the base station for authenticated mobile stations without requiring supporting connection management signaling between the base station and the mobile switching center comprises allocating and de-allocating radio resources as needed at the base station without requiring supporting connection management signaling to the mobile switching center, in response to packet data connection state transitions by authenticated mobile stations.

6. The method of claim 1, wherein processing selected packet data connection events at the base station for authenticated mobile stations without requiring supporting connection management signaling between the base station and the mobile switching center comprises delivering mobile-terminated and mobile-originated short data burst messages for authenticated mobile stations without sending corresponding connection management signaling to the mobile switching center.

7. The method of claim 1, further comprising placing a time or activity limit on individual ones of the authenticated mobile stations, so that a given authenticated mobile station must be re-authenticated via connection management signaling between the base station and the mobile switching center after a defined time period, or after a defined amount of packet data connection activity.

8. A method of reducing connection management signaling between a base station and a mobile switching center in a cdma2000 wireless communication network, the method comprising:
- maintaining connection information at the base station to identify currently authenticated mobile stations having established packet data connections with the network;
- managing packet data state transitions by currently authenticated mobile stations at the base station without corresponding connection management control by the mobile switching center; and
- for each mobile station that is considered by the base station to be currently authenticated, maintaining a re-authentication counter that limits the number of state transitions that can be made by the mobile station before a re-authentication by the mobile switching center is required.

9. The method of claim 8, wherein managing packet data state transitions by currently authenticated mobile stations at the base station without corresponding connection management control by the mobile switching center comprises managing active-to-dormant and dormant-to-active state transitions at the base station for currently authenticated mobile stations without sending corresponding connection management signaling to the mobile switching center.

10. The method of claim 8, wherein maintaining connection information at the base station to identify currently authenticated mobile stations having established packet data connections with the network comprises, for individual mobile stations, saving a mobile station identifier at the base station as part of initial packet data call setup, and subsequently maintaining connection state information at the base station for the individual mobile stations to track their packet data connection states.

11. The method of claim 10, wherein managing packet data state transitions by currently authenticated mobile stations at the base station without corresponding connection management control by the mobile switching center comprises:
- detecting a state transition by a mobile station;
- identifying that mobile station as a currently authenticated mobile station by matching identification information received from the mobile station with one of the saved mobile station identifiers; and
- suppressing the connection management signaling messages that otherwise are sent from the base station to the mobile switching center for managing state transitions by mobile stations which are not currently authenticated.

12. The method of claim 10, wherein maintaining connection state information at the base station for the individual mobile stations to track their packet data connection states comprises using connection state information retained by a packet control function that is associated with the base station.

13. The method of claim 8, maintaining connection information at the base station to identify currently authenticated mobile stations having established packet data connections with the network comprises storing mobile station identifiers at the base station for mobile stations that have been authenticated by the mobile switching center as part of packet data call setup processing.

14. The method of claim 8, further comprising maintaining a re-authentication forcing control at the base station that limits the period over which individual ones of the currently authenticated mobile stations are considered by the base station to be currently authenticated.

15. The method of claim 8, further comprising, for each mobile station that is considered by the base station to be currently authenticated, maintaining a re-authentication timer that limits the time period the mobile station is considered by the base station to be currently authenticated.

16. The method of claim 15, further comprising starting the timer responsive to an authentication of the mobile station by the mobile switching center.

17. The method of claim 8, further comprising zeroing the re-authentication counter responsive to an authentication of the mobile station by the mobile switching center.

18. The method of claim 8, wherein managing packet data state transitions by currently authenticated mobile stations at the base station without corresponding connection management control by the mobile switching center comprises, for a given one of the currently authenticated mobile stations, suppressing connection management signaling from the base station in response to a first active-to-dormant state transition by the mobile station, such that the mobile switching center remains unapprised that the mobile station has transitioned to the dormant state.

19. The method of claim 18, further comprising suppressing connection management signaling from the base station to mobile switching center in response to subsequent dormant-to-active and active-to-dormant state transitions by the mobile station, such that the mobile switching center remains unapprised of the subsequent state transitions.

20. The method of claim 8, wherein managing packet data state transitions by currently authenticated mobile stations at the base station without corresponding connection management control by the mobile switching center comprises, for a given one of the currently authenticated mobile stations, suppressing connection management signaling from the base station in response to a first dormant-to-active state transition by the mobile station, such that the mobile switching center remains unapprised that the mobile station has transitioned to the active state.

21. The method of claim 20, further comprising suppressing connection management signaling from the base station to mobile switching center in response to subsequent dormant-to-active and active-to-dormant state transitions by the mobile station, such that the mobile switching center remains unapprised of the subsequent state transitions.

22. The method of claim 20, further, comprising sending a connection management service request message from the base station to the mobile switching center responsive to receiving a paging request message for the mobile station if the mobile station is in the active state and the mobile switching center is unapprised of that state.

23. The method of claim 8, further comprising, for currently authenticated mobile stations, sending short data burst messages received from a packet data serving node to targeted ones of the currently authenticated mobile stations without sending corresponding connection management signaling to the mobile switching center.

24. The method of claim 8, further comprising, for currently authenticated mobile stations, sending short data burst messages received from respective ones of the currently authenticated mobile stations to a packet data serving node without sending corresponding connection management signaling to the mobile switching center.

25. A base station controller configured to reduce connection management signaling to a mobile switching center in a cdma2000 wireless communication network, said base station controller comprising one or more processing circuits configured to:

maintain connection information at the base station to identify currently authenticated mobile stations having established packet data connections with the network;

manage packet data state transitions by currently authenticated mobile stations at the base station without corresponding connection management control by the mobile switching center; and maintain, for each mobile station that is considered by the base station to be currently authenticated, a re-authentication counter that limits the number of state transitions that can be made by the mobile station before a re-authentication by the mobile switching center is required.

26. The base station controller of claim 25, wherein the one or more processing circuits include one or more memory circuits configured to store the connection information.

27. The base station controller of claim 25, wherein the one or more processing circuits include one or more call control circuits configured to re-authenticate mobile stations transitioning from a dormant packet data state to an active packet data state using the connection information stored at the base station.

28. The base station controller of claim 25, wherein the one or more processing circuits are configured to save mobile station identifiers at the base station during packet data call setup, such that mobile station identifiers are saved at the base station as new packet data connections are established with given mobile stations.

29. The base station controller of claim 25, wherein the one or more processing circuits are configured to track connection state information for the mobile stations having saved mobile station identifiers at the base station.

30. The base station controller of claim 25, wherein the one or more processing circuits comprise one or more call control circuits configured to:

detect a state transition by a mobile station;

identify that mobile station as a currently authenticated mobile station by matching identification information received from the mobile station with one of the saved mobile station identifiers; and allocate and de-allocate radio resources at the base station as appropriate for the state transition without sending associated connection management signaling to the mobile switching center.

31. The base station controller of claim 30, wherein the one or more processing circuits are further configured to process short data burst messages for the currently authenticated mobile stations without requiring connection management signaling between the base station and the mobile switching center.

32. A method of reducing connection management signaling between a base station and a mobile switching center in a cdma2000 wireless communication network, the method comprising:

saving authentication information at the base station for a mobile station having an established packet data connection;

authenticating the mobile station as needed at the base station using the saved authentication information to thereby allow the mobile station to return from a dormant packet data connection state to an active packet data connection state without requiring re-authentication of the mobile station by the mobile switching center; and maintaining a re-authentication counter for the mobile station, counting packet data connection state transitions by the mobile station via the re-authentication counter, and requiring re-authentication of the mobile station by the mobile switching center for a dormant-to-active packet data connection state transition by the mobile station that occurs after reaching a defined limit for the re-authentication counter.

33. The method of claim 32, wherein saving authentication information at the base station for a mobile station comprises saving at least a mobile station identifier for the mobile station.

34. The method of claim 32, further comprising maintaining a re-authentication timer for the mobile station, and requiring re-authentication of the mobile station by the mobile switching center for a dormant-to-active packet data connection state transition by the mobile station that occurs after expiration of the re-authentication timer.

35. The method of claim 34, further comprising starting the re-authentication timer responsive to the mobile station being authenticated by the mobile switching center.

* * * * *